United States Patent
Mauldin

[15] 3,635,492
[45] Jan. 18, 1972

[54] TRAILER

[72] Inventor: Louis D. Mauldin, 2308 Grand Avenue, Phoenix, Ariz. 85009

[22] Filed: Dec. 5, 1969

[21] Appl. No.: 882,527

[52] U.S. Cl. .......................................... 280/43.23, 214/506
[51] Int. Cl. ................................................. B60p 3/10
[58] Field of Search ............ 214/506; 280/414, 43.11, 43.23

[56] References Cited

UNITED STATES PATENTS

| | | | |
|---|---|---|---|
| 2,835,400 | 5/1958 | Latzke | 214/505 X |
| 2,876,922 | 3/1959 | Holiday | 214/506 |
| 3,180,510 | 4/1965 | Moller | 214/506 |
| 3,318,472 | 5/1967 | Clark | 280/43.23 X |

*Primary Examiner*—Albert J. Makay
*Attorney*—Martin L. Stoneman

[57] ABSTRACT

A trailer having a hydraulically operated mechanism for elevating and lowering the frame of the trailer. A unique offset rotatable axle is operable to move the frame from the normal substantially horizontal travel position to a position in which the rear portion of the frame is lowered for ease of loading or unloading.

1 Claims, 6 Drawing Figures

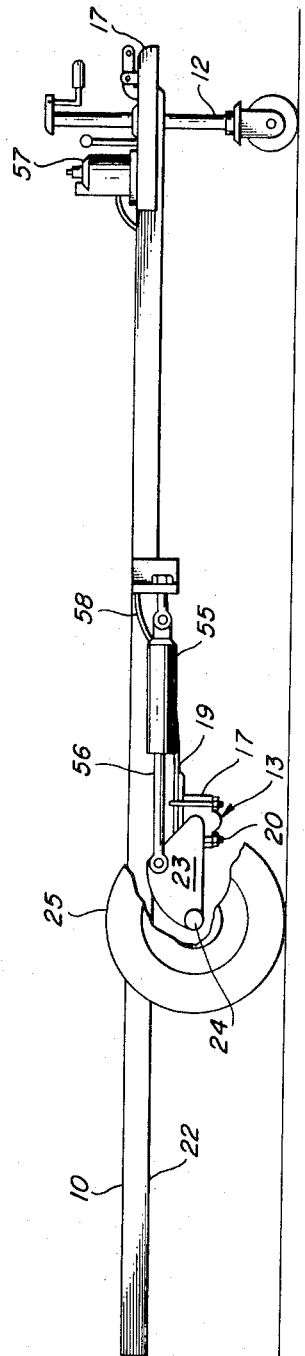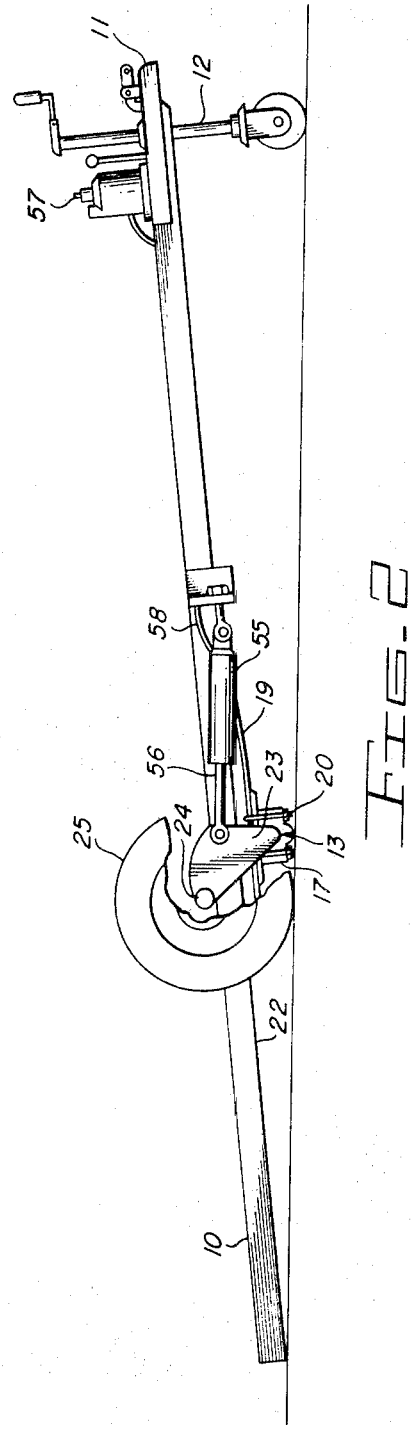

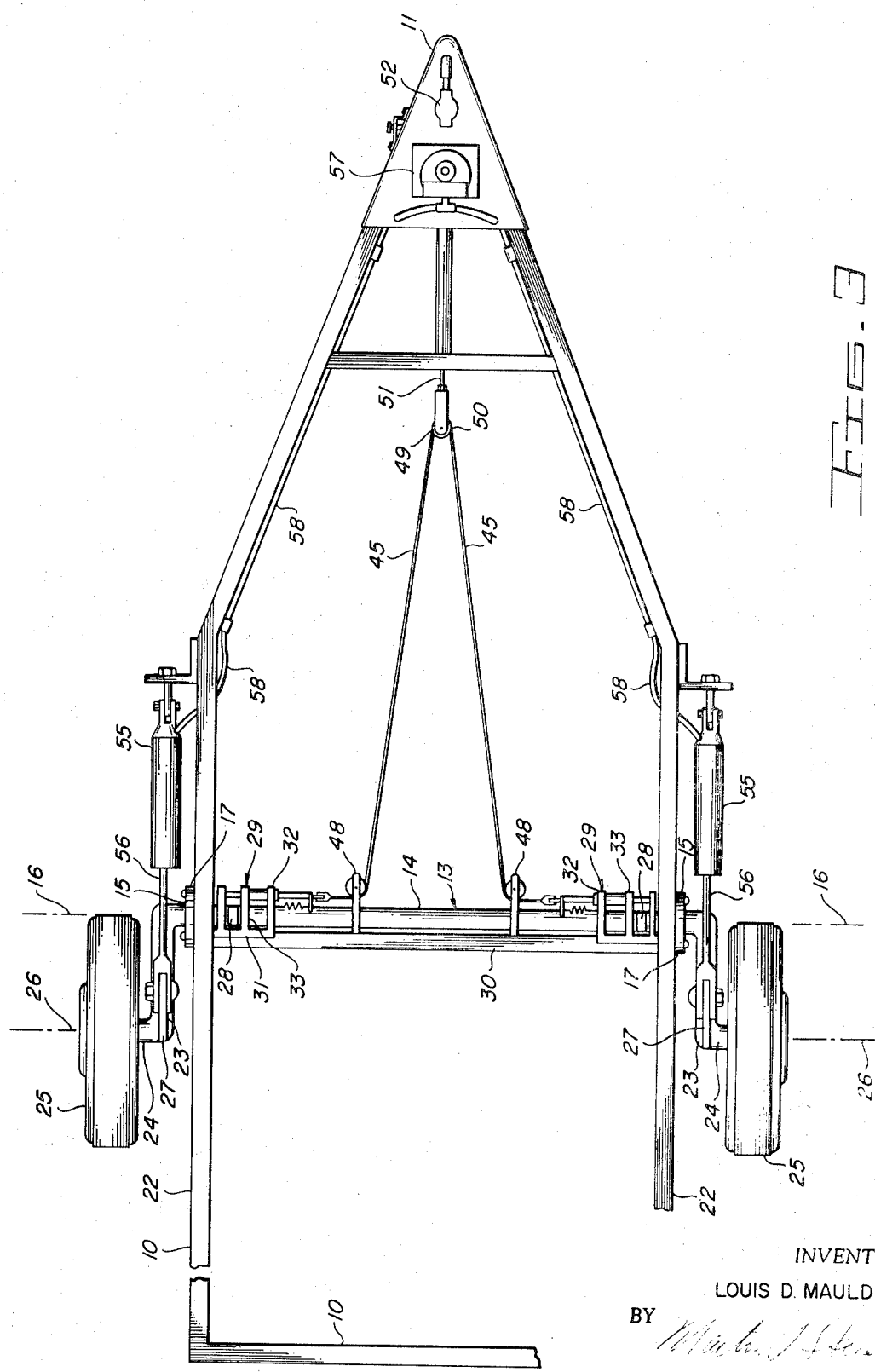

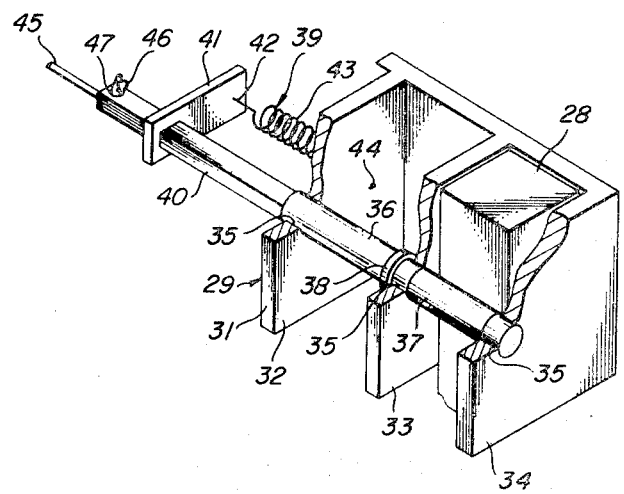
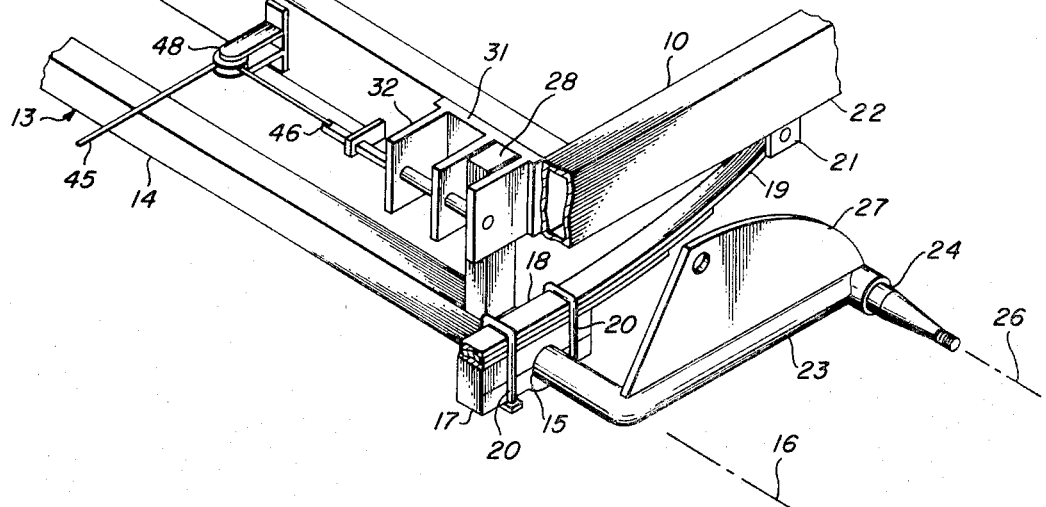
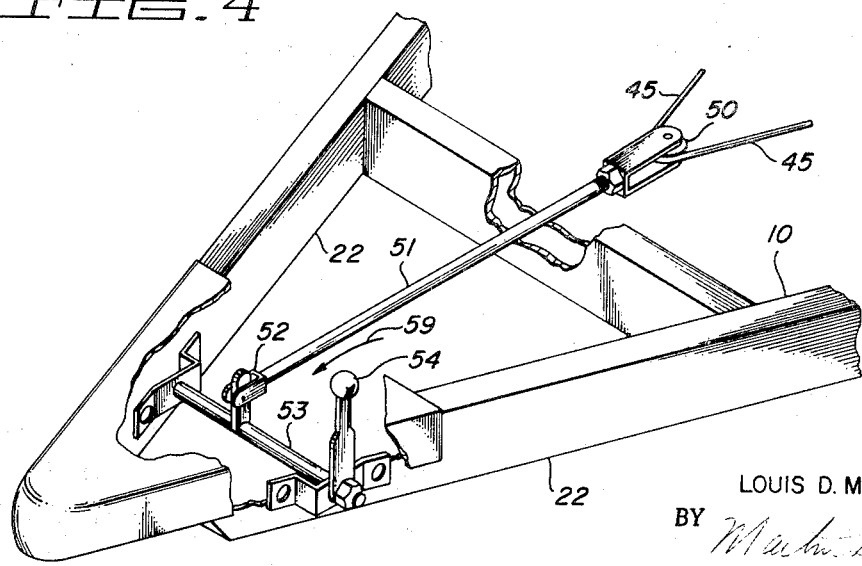
INVENTOR.
LOUIS D. MAULDIN

TRAILER

BACKGROUND OF THE INVENTION

This invention relates to the art of vehicle construction.

More particularly, the invention concerns a trailer vehicle.

In a further aspect, the invention concerns a trailer having a hydraulically operable mechanism for raising and lowering the trailer frame for ease of loading and unloading.

In a still further aspect, the invention concerns a trailer assembly of the above type which may be operated by one man, and provides a locking feature to prevent inadvertent operation.

Loading and unloading of trailers is a laborious task when heavy or bulky items are involved. This problem is especially troublesome when a trailer is adapted for the transporting of a boat. Many beaches do not have loading and unloading facilities, and, to launch a boat, the driver is required to back the trailer and towing vehicle into the water to float the boat off the trailer. On shallow beaches, this often requires backing a considerable distance.

Many devices are available to assist loading and unloading of trailers, such as portable ramps, mechanical and power-assisted tailgate loaders, and the like. These devices have their uses, but some cargo is not suited for this type of loading. Mechanisms have also been devised to assist launching of boats, and have been conventionally constructed so that the trailer is provided with two frames, a stationary frame and one that pivots about the axle. This type of device is an improvement, but is not entirely satisfactory, as the two frames greatly increase the weight of the vehicle. They also require elaborate actuation mechanisms. Another limitation of these prior art devices is that the frame pivots about the axle, thus putting the fulcrum close to the rear of the trailer. With the fulcrum thus located, the frame angle is quite steep when the mechanism is in the lowered position. The steep frame angle makes loading difficult, and during unloading this results in only the aft section of the boat entering the water, thus requiring that the trailer be driven further into the water.

It would be highly advantageous, therefore, to provide a relatively simple mechanism for lowering the frame of a trailer so that the frame forms an acute angle with respect to the ground surface.

SUMMARY OF THE INVENTION

It is the primary object of the present invention, therefore, to provide a lightweight, simple mechanism for raising and lowering the frame of a trailer.

Another object of the present invention is to provide a trailer frame lowering mechanism with the fulcrum positioned at the trailer hitch so that the lowered frame forms an acute angle with respect to the ground surface.

A further object of the present invention is to provide an offset rotatable axle, actuatable for raising and lowering the frame of a trailer.

A further object of the present invention is to provide a simple power means to rotate an offset axle to raise and lower the frame of a trailer.

Yet a further object of the present invention is to provide a releasable locking mechanism to prevent rotation of the axle when the trailer is in the normal or travel position.

Briefly, to accomplish the desired objectives of my present invention, I provide an axle which is rotatably mounted to the road springs of a trailer frame. The axle has an offset axis portion and a wheel-mounting axis in spaced-parallel relationship. The axle is mounted so that, when actuated, the offset axis portion will rotate about the wheel-mounting axis. When the trailer is in the travel position, axle rotation is prevented by stabilizer bars attached to the axle. These bars are held against rotary motion by locking them against the frame. To lower the trailer frame, the stabilizer bars are unlocked and hydraulic cylinders connected to the axle control rotation thereof to effect lowering of the frame.

BRIEF DESCRIPTION OF THE DRAWINGS

Further and more specific objects and advantages of the present invention will become readily apparent to those skilled in the art from the following detailed description thereof taken in connection with the drawings, in which:

FIG. 1 is a side view of the trailer of the present invention, partially broken away to show the mechanism in a substantially horizontal or travel position.

FIG. 2 is a side view, partially broken away, similar to FIG. 1 but showing the mechanism in a lowered position.

FIG. 3 is a plan view of the trailer of the present invention, and illustrating the features thereof.

FIG. 4 is a fragmentary, partially broken away, perspective view of the forward portion of the trailer, illustrating the actuating mechanism of the present invention.

FIG. 5 is a fragmentary perspective view of the frame and axle assemblies of the present invention.

FIG. 6 is an enlarged fragmentary perspective view of the locking mechanism of the present invention.

DESCRIPTION OF THE PREFERRED EMBODIMENT

Turning now to the drawings, in which the same reference numerals indicate corresponding elements throughout the various figures, FIGS. 1 and 2 illustrate the two positions of the trailer. FIG. 1 shows the mechanism in a substantially horizontal, normal or travel position and FIG. 2 illustrates the position of the mechanism during the loading or unloading operations.

The trailer, as shown best in FIGS. 1, 2, and 3, comprises a frame 10 having the usual hitch 11, and jack 12. The frame 10 is shown as rectangular. This configuration was chosen only for illustrative purposes as many frame configurations are available to suit as many needs. Therefore, it is intended that this invention not be limited to a particular frame design.

A rotatably mounted axle 13, as best shown in FIGS. 3 and 5, is provided with a center portion 14 extending substantially the width of the trailer, and extending outwardly therefrom are cylindrical bearing portions 15. The center portion 14 and the bearing portions 15 extending from the ends of the center portion define an offset axis 16 of axle 13. The bearing portions 15 are housed in pillow blocks 17 which are secured to the intermediate portion 18 of road springs 19 by the usual U-bolts 20. The springs 19 are mounted on their ends 21 to the underneath portions of the side rails 22 of frame 10 in the conventional manner. The cylindrical bearing portions 15 extend outwardly from the pillow blocks 17 and are formed into integral, rearwardly extending portions or cam supports 23. The supports 23 are substantially perpendicular with respect to the axle 13. Appropriately secured to the ends of the supports 23 are wheel spindles 24 to which wheels 25 are conventionally mounted. The spindles 24 define a wheel axis 26 about which the offset axis 16 is adapted to pivot. The cam supports 23 each have cam plates 27 welded or otherwise secured to their upwardly facing surfaces. A pair of stabilizer bars 28 are spacedly attached to the center portion 14 of axle 13, and are adapted to rotate therewith. The function of the axle 13 and the elements associated therewith will hereinafter be described in detail.

A locking means 29 is provided to prevent axle rotation when it is desired to maintain the trailer in the travel position. This is accomplished by maintaining the stabilizer bars 28 in a substantially vertical position adjacent a crossmember 30 of the frame 10. It should be understood that a locking means or mechanism 29 is provided for each stabilizer bar 28. The following description of construction and operation will be applied to one of the mechanisms 29, but, since they are identical, it is intended to describe both mechanisms.

The locking mechanism 29 comprises a housing 31 having three spacedly arranged parallel plates 32, 33, and 34. The housing 31 is appropriately attached to the crossmember 30. Each of the plates 32, 33, and 34 is provided with an aperture 35 positioned in a coaxial relationship. A locking shaft 36 is slidably mounted in the coaxial apertures 35 and is adapted for actuation between a locked position and an unlocked position. The locking shaft 36 is provided with a rotatably mounted sleeve bearing 37 to permit the stabilizer bars 28 to travel vertically as a result of normal road spring action. Proper positioning of the locking shaft 36 is provided by a collar 38 mounted on the shaft 36 and positioned between the plates 32 and 33. Overinsertion of the shaft 36 is prevented by the collar 38 contacting plate 33, and complete removal of the shaft 36 is prevented by the collar 38 contacting plate 32. A biasing means 39 is provided to urge the locking shaft 36 into the locked position. As best seen in FIG. 5, the inwardly facing end 40 of the shaft 36 has a rectangular cross section on which a slidably mounted washer 41 is assembled. The washer 41 is connected to one end 42 of spring 43, the other end 44 of the spring 43 being appropriately attached to plate 32 of the housing 31. When a retracting force is applied to shaft 36, as hereinafter will be described, the spring 43 will cause washer 41 to tilt and frictionally engage the rectangular end 40 of shaft 36. Thus, further retraction of the shaft will increase the biasing force.

Moving the locking shafts 36 from the locked position to the unlocked position is accomplished by a cable 45, the ends 46 of which are attached to apertures 47 provided in the ends 40 of locking shafts 36. The cable 45 is threaded through pulleys 48 mounted on crossmember 30 and are directed toward the front of the frame 10, where the intermediate portion of the cable 45 forms a loop 49 threaded through pulley 50. The pulley 50 is carried on one end of a rod 51. The other end of the rod 50 is provided with a clevis 52 for attachment to a crossrod 53 rotatably mounted in frame 10. Crossrod 53 is provided with a hand lever 54 on one end thereof.

Hydraulic cylinders 55 are suitably mounted on the side rails 22 of the frame 10. The piston shafts 56 of cylinders 55 are connected to the cam plates 27 to control rotation of axle 13, as will be described hereinafter in detail. The cylinders 55 are actuated by a suitable pump 57, which may be a conventional automotive hydraulic jack, which is connected to the cylinders 55 by suitable hydraulic lines 58 mounted on the frame 10.

OPERATION

To lower the trailer from its travel position to its loading or unloading position, pump 57 is sufficiently actuated to rotate axle 13 enough to relieve the load exerted by the stabilizer bars 28 on the sleeve bearings 37 of the locking shaft 36. The lever 54 is then moved in the direction indicated by arrow 59, FIG. 4. This rotates crossrod 53, pulling cable 45 and retracting locking shafts 36. The hydraulic pressure is then slowly released, and the weight of the trailer will cause the offset axis 16 to rotate about the wheel axis 26, thus lowering the trailer frame.

To raise the trailer, the operation is reversed. With the locking shafts 36 held retracted, hydraulic pressure is applied to the cylinders 55 to rotate axle 13 until the stabilizer bars 28 are in contact with the crossmember 30. The lever 54 is then released, permitting the biasing means 39 to return the shafts 36 to the locked position.

Various changes in the mechanism herein chosen for purposes of illustration in the drawings will be readily apparent to persons skilled in the art, having read the disclosure hereof. To the extent that such modifications and variations do not depart from the spirit of the invention, they are intended to be included within the scope thereof, which is not limited to the mechanism or method specifically illustrated but rather only by a fair interpretation of the following claim.

Having fully described the invention in such manner as to enable those skilled in the art to understand and practice the same, I claim:

1. A mechanism for raising and lowering the frame of a trailer having road springs, the mechanism comprising:
   a. a rotatable axle having a wheel axis and an offset axis in spaced-parallel relationship;
   b. axle-mounting means for rotatably mounting said axle to the road springs of said trailer;
   c. at least one stabilizer bar mounted on said axle for rotation therewith;
   d. releasable locking means mounted on the frame of said trailer for securing said stabilizer bar therein to prevent rotation of said axle;
   e. power means mounted on said frame and coupled to said axle for controlling the rotation of said offset axis about said wheel axis;
   f. said releasable locking means comprising:
      1. at least one housing having three spacedly arranged parallel plates, each of said plates having an aperture formed therein so that said apertures are coaxial, said housing being attached to said frame and positioned to retractably receive said stabilizer bar between two of said plates;
      2. a locking shaft for said housing, said shaft being slidably mounted in the said coaxial apertures of said plates, said shaft being positionable between a locked position and an unlocked position to control retraction of said stabilizer bar from between said plates;
      3. a rotatable sleeve bearing on said locking shaft to permit vertical motion of said stabilizer bar within said housing;
      4. a collar mounted on said locking shaft to limit the motion thereof between said locked and unlocked positions;
      5. biasing means between said housing and said locking shaft for urging said shaft into said locked position; and
      6. a cable attached to said locking shaft, said cable being mounted on said frame and adapted for actuation to move said locking shaft from said locked position to said unlocked position.

* * * * *